(12) United States Patent
Rosén

(10) Patent No.: US 11,041,633 B2
(45) Date of Patent: *Jun. 22, 2021

(54) DISTRICT THERMAL ENERGY DISTRIBUTION SYSTEM

(71) Applicant: E.ON Sverige AB, Malmö (SE)

(72) Inventor: Per Rosén, Lund (SE)

(73) Assignee: E.ON SVERIGE AB, Malmö (SE)

( * ) Notice: Subject to any disclaimer, the term of this patent is extended or adjusted under 35 U.S.C. 154(b) by 301 days.

This patent is subject to a terminal disclaimer.

(21) Appl. No.: 15/970,698

(22) PCT Filed: Nov. 2, 2016

(86) PCT No.: PCT/EP2016/076356
§ 371 (c)(1),
(2) Date: May 3, 2018

(87) PCT Pub. No.: WO2017/076868
PCT Pub. Date: May 11, 2017

(65) Prior Publication Data
US 2018/0259196 A1   Sep. 13, 2018

(30) Foreign Application Priority Data

Nov. 4, 2015   (EP) ..................... 15192955

(51) Int. Cl.
  *F24D 10/00* (2006.01)
  *F24D 19/10* (2006.01)
(52) U.S. Cl.
  CPC ....... *F24D 10/003* (2013.01); *F24D 19/1069* (2013.01); *Y02B 30/17* (2018.05); *Y02E 20/14* (2013.01); *Y02P 80/14* (2015.11)
(58) Field of Classification Search
  CPC ... F24D 10/003; F24D 19/1069; Y02B 30/17; Y02P 80/14; Y02P 20/14
(Continued)

(56) References Cited

U.S. PATENT DOCUMENTS

| | | | |
|---|---|---|---|
| 2005/0081507 A1* | 4/2005 | Tumelty | F02C 7/224 60/39.08 |
| 2012/0279681 A1* | 11/2012 | Vaughan | F24D 19/1039 165/62 |
| 2015/0083362 A1* | 3/2015 | Liu | F24D 17/0005 165/45 |

FOREIGN PATENT DOCUMENTS

| | | |
|---|---|---|
| DE | 3123875 A1 | 3/1982 |
| DE | 19810416 A1 | 9/1998 |

(Continued)

OTHER PUBLICATIONS

International search report & written opinion dated Feb. 3, 2017 in PCT/EP2016/076356 filed Nov. 2, 2016.

(Continued)

*Primary Examiner* — Kenneth J Hansen
*Assistant Examiner* — John E Bargero
(74) *Attorney, Agent, or Firm* — Xsensus LLP

(57) ABSTRACT

The present invention relates to a district thermal energy distribution system comprising a thermal energy circuit comprising a hot and a cold conduit for allowing flow of heat transfer liquid therethrough, a thermal energy consumer heat exchanger and a thermal energy generator heat exchanger. The thermal energy consumer heat exchanger is selectively connected to the hot conduit via a thermal energy consumer valve or a thermal energy consumer pump. The thermal energy generator heat exchanger is selectively connected to the cold conduit via a thermal energy generator valve or a thermal energy generator pump.

14 Claims, 2 Drawing Sheets

(58) Field of Classification Search
USPC .......................................................... 237/8 A
See application file for complete search history.

(56) References Cited

FOREIGN PATENT DOCUMENTS

| | | |
|---|---|---|
| WO | 99/54665 A1 | 10/1999 |
| WO | 2010145040 A1 | 12/2010 |

OTHER PUBLICATIONS

Communication Under Rule 71(3) dated Mar. 13, 2020 in European Application No. 16790345.9.
Decision to Grant a European Patent Pursuant to Article 97(1) dated Jun. 25, 2020 in European Application No. 16790345.9.

* cited by examiner

DISTRICT THERMAL ENERGY DISTRIBUTION SYSTEM

FIELD OF THE INVENTION

The invention relates to a district thermal energy distribution system for distributing energy within a city of a part of a city.

BACKGROUND OF THE INVENTION

Nearly all large developed cities in the world have at least two types of energy grids incorporated in their infrastructures; one grid for providing electrical energy and one grid for providing space heating and hot tap water preparation. A common grid used for providing space heating and hot tap water preparation is a gas grid providing a burnable gas, typically a fossil fuel gas. The gas provided by the gas grid is locally burned for providing space heating and hot tap water. An alternative for the gas grid for providing space heating and hot tap water preparation is a district heating grid. Also the electrical energy of the electrical energy grid may be used for space heating and hot tap water preparation. Also the electrical energy of the electrical energy grid may be used for space cooling. The electrical energy of the electrical energy grid is further used for driving refrigerators and freezers.

Accordingly, traditional building heating and cooling systems use primary high grade energy sources such as electricity and fossil fuels or an energy source in the form of industrial waste heat to provide space heating and/or cooling, and to heat or cool water used in the building. Furthermore, it has been increasingly common to also install a district cooling grid in cities for space cooling. The process of heating or cooling the building spaces and water converts this high grade energy into low grade waste heat with high entropy which leaves the building and is returned to the environment.

Hence, there is a need for an improved and cost-effective system to heat and/or cool buildings and tap water reducing the waste heat returned to the environment.

SUMMARY OF THE INVENTION

It is an object of the present invention to solve at least some of the problems mentioned above.

According to a first aspect a district thermal energy distribution system is provided. The district thermal energy distribution system comprises a thermal energy circuit comprising two conduits for allowing flow of heat transfer liquid therethrough, wherein a hot conduit in the thermal energy circuit is configured to allow heat transfer liquid of a first temperature to flow therethrough, and wherein a cold conduit in the thermal energy circuit is configured to allow heat transfer liquid of a second temperature to flow therethrough, the second temperature is lower than the first temperature; one or more local thermal energy consumer assemblies, each comprising: a thermal energy consumer heat exchanger selectively connected to the hot conduit via a thermal energy consumer valve for allowing heat transfer liquid from the hot conduit to flow into the thermal energy consumer heat exchanger, selectively connected to the hot conduit via a thermal energy consumer pump for pumping heat transfer liquid from the hot conduit into the thermal energy consumer heat exchanger and connected to the cold conduit for allowing return of heat transfer liquid from the thermal energy consumer heat exchanger to the cold conduit, wherein the thermal energy consumer heat exchanger is arranged to transfer thermal energy from heat transfer liquid to surroundings of the thermal energy consumer heat exchanger, such that heat transfer liquid returned to the cold conduit has a temperature lower than the first temperature and preferably a temperature equal to the second temperature; a first pressure difference determining device adapted to determine a first local pressure difference of the thermal energy circuit; and a first controller arranged to, based on the first local pressure difference, selectively control the use of either the thermal energy consumer valve or the thermal energy consumer pump; and one or more local thermal energy generator assemblies, each comprising: a thermal energy generator heat exchanger selectively connected to the cold conduit via a thermal energy generator valve for allowing heat transfer liquid from the cold conduit to flow into the thermal energy generator heat exchanger, selectively connected to the cold conduit via a thermal energy generator pump for pumping heat transfer liquid from the cold conduit into the thermal energy generator heat exchanger, and connected to the hot conduit for allowing return of heat transfer liquid from the thermal energy generator heat exchanger to the hot conduit, wherein the thermal energy generator heat exchanger is arranged to transfer thermal energy from its surroundings to heat transfer liquid, such that the heat transfer liquid returned to hot conduit has a temperature higher than the second temperature and preferably a temperature equal to the first temperature; a second pressure difference determining device adapted to determine a second local pressure difference of the thermal energy circuit; and a second controller arranged to, based on the second local pressure difference, selectively control the use of either the thermal energy generator valve or the thermal energy generator pump.

The wording "selectively connected" should be construed as the heat exchanger concerned is at one point in time in fluid connection either via the pump or via the valve to the respective conduit. Hence, it may be selected if the heat exchanger concerned shall be in fluid connection with the respective conduit via the pump or via the valve.

The wording "valve" should be construed as a device configured to, in a controlled way, allowing heat transfer liquid to flow through the valve when the valve is in an opened state. Moreover, the valve may also be arranged such that the flow rate of heat transfer liquid through the valve may be controlled. Hence, the valve may be a regulation valve arranged for regulating the flow of heat transfer liquid therethrough.

The wording "pump" should be construed as a device configured to, in a controlled way, allowing heat transfer liquid to be pumped through the pump when the pump is in an active pumping state. Moreover, the pump may also be arranged such that the flow rate of heat transfer liquid through the pump may be controlled.

The district thermal energy distribution system allows for the local pressure difference between heat transfer liquid of the hot and cold conduits to vary along the thermal energy circuit. Especially, the local pressure difference between heat transfer liquid of the hot and cold conduits may vary from positive to negative pressure difference seen from one of the hot and cold conduits. The district thermal energy distribution system further allows for the possibility to let all the pumping within the system to take place in the local thermal energy consumer/generator assemblies. Due to the limited flows and pressures needed small frequency controlled circulation pumps may be used. Hence, an easy to build district thermal energy distribution system is provided. Further a district thermal energy distribution system that is easy to control is provided.

The basic idea of the district thermal energy distribution system is based on the insight by the inventors that modern day cities by them self-provided thermal energy that may be reused within the city. The reused thermal energy may be picked up by the district thermal energy distribution system and be used for e.g. space heating or hot tap water preparation. Moreover, increasing demand for space cooling will also be handled within the district thermal energy distribution system. Within the district thermal energy distribution system buildings within the city are interconnected and may in an easy and simple way redistribute low temperature waste energy for different local demands. Amongst other the district thermal energy distribution system will provide for:

Minimizing the use of primary energy due to optimal re-use of energy flows inside the city.

Limiting the need for chimneys or firing places inside the city, since the need for locally burning gas or other fuels will be reduced.

Limiting the need for cooling towers or cooling convectors inside the city, since excess heat produced by cooling devices may be transported away and reused within the district thermal energy distribution system.

Hence, the district thermal energy distribution system provides for a smart duel use of thermal energy within a city. When integrated into a city the district thermal energy distribution system provides make use of low level thermal energy waste in both heating and cooling applications within the city. This will reduce the primary energy consumption of a city by eliminating the need for a gas grid or a district heating grid and a cooling grid in city.

The hot and cold conduits may be dimensioned for pressures up to 0.6 MPa, 1 MPa, or 1.6 MPa.

The first and second local pressure differences may be set to be at most ±0.2 MPa, ±0.3 MPa or ±0.6 MPa depending on chosen dimensioning pressure. Hence, when the hot and cold conduits are dimensioned for pressures up to 0.6 MPa the first and second local pressure differences may be set to be at most ±0.2 MPa, when the hot and cold conduits are dimensioned for pressures up to 1 MPa the first and second local pressure differences may be set to be at most ±0.3 MPa, and when the hot and cold conduits are dimensioned for pressures up to 1.6 MPa the first and second local pressure differences may be set to be at most ±0.6 MPa.

The first controller may be arranged to selectively use the thermal energy consumer valve when the first local pressure difference indicates that the first local pressure of the heat transfer liquid of the hot conduit is larger than the first local pressure of the heat transfer liquid of the cold conduit.

The first controller may be arranged to selectively use the thermal energy consumer pump when the first local pressure difference indicates that the first local pressure of the heat transfer liquid of the hot conduit is lower than or equal to the first local pressure of the heat transfer liquid of the cold conduit.

The second controller may be arranged to selectively use the thermal energy generator valve when the second local pressure difference indicates that the second local pressure of the heat transfer liquid of the cold conduit is larger than the second local pressure of the heat transfer liquid of the hot conduit.

The second controller may be arranged to selectively use the thermal energy generator pump when the second local pressure difference indicates that the second local pressure of the heat transfer liquid of the cold conduit is lower than or equal to the second local pressure of the heat transfer liquid of the hot conduit.

The system may further comprise a building comprising both a local thermal energy consumer assembly and a local thermal energy generator assembly, wherein the first pressure difference determining device of the local thermal energy consumer assembly of the building and the second pressure difference determining device of the local thermal energy generator assembly of the building are integrally formed as a single pressure difference determining device.

The system may further comprise a building comprising both a local thermal energy consumer assembly and a local thermal energy generator assembly, wherein the first controller of the local thermal energy consumer assembly of the building and the second controller of the local thermal energy generator assembly of the building are integrally formed as a single controller.

The thermal energy consumer heat exchanger may be chosen from the group consisting of a heat pump for comfort heating, a heat pump for tap hot water preparation and a heat pump for snow or ice purging.

The thermal energy generator heat exchanger may be chosen from the group consisting of a cooling machine for local comfort cooling, a heat exchanger in a forced exit air ventilation system, a heat exchanger in a waste water system, a freezer and a cooling machine for a computer center.

The temperature range of the first and second temperatures may be −10-45° C., preferably 4-32° C.

The temperature difference between the first and second temperatures may be in the range of 5-16° C., preferably in the range of 7-12° C., more preferably 8-10° C.

The first local pressure difference of the thermal energy circuit may comprise a pressure difference between a first local pressure of the heat transfer liquid of the hot conduit and a first local pressure of the heat transfer liquid of the cold conduit.

The first pressure difference determining device may be arranged to determine the first local pressure of the heat transfer liquid of the hot conduit in the vicinity to where the thermal energy consumer heat exchanger is connected to the hot conduit and to determine the first local pressure of the heat transfer liquid of the cold conduit in the vicinity to where the thermal energy consumer heat exchanger is connected to the cold conduit.

The wording "in the vicinity of" should be construed as being sufficiently close to the connection between the thermal energy consumer/generator heat exchanger and the hot/cold conduit such that the determined local pressure difference does not deviate from the actual local pressure difference between the input and output of the thermal energy consumer/generator heat exchanger with more than 5%. Typically, the first pressure difference determining device is arranged to determine a local pressure of the heat transfer liquid of the hot conduit and a local pressure of the heat transfer liquid of the cold conduit on a portion of the hot and cold conduits being located in the same building as the thermal energy consumer/generator heat exchanger. Or more precisely, the first pressure difference determining device is arranged to determine a local pressure of the heat transfer liquid of the hot conduit and a local pressure of the heat transfer liquid of the cold conduit on a portion of the hot and cold conduits being located in the same room as the thermal energy consumer/generator heat exchanger. Hence, in the vicinity of should alternatively or in combination be construed as being in the same building or the same room.

The second local pressure difference of the thermal energy circuit may comprise a pressure difference between a second local pressure of the heat transfer liquid of the hot conduit and a second local pressure of the heat transfer liquid of the cold conduit.

The second pressure difference determining device may be arranged to determine the second local pressure of the heat transfer liquid of the hot conduit in the vicinity to where the thermal energy generator heat exchanger is connected to the hot conduit and to determine the second local pressure of the heat transfer liquid of the cold conduit in the vicinity to where the thermal energy generator heat exchanger is connected to the cold conduit.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

These and other aspects of the present invention will now be described in more detail, with reference to the appended drawings showing embodiments of the invention. The figures are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
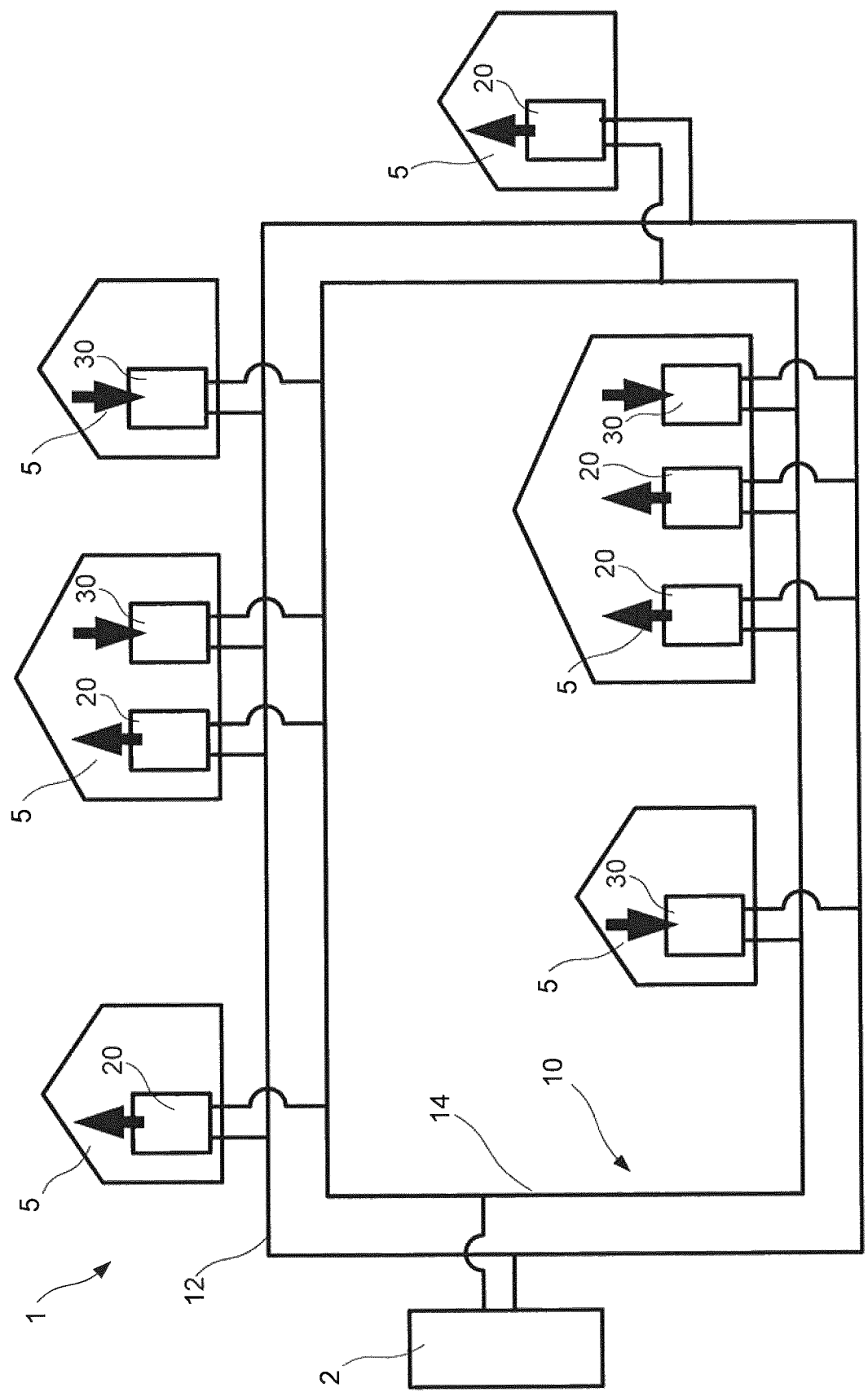
FIG. 1 is a schematic diagram of a district thermal energy distribution system.

In FIG. 1 a district thermal energy distribution system 1 is illustrated. The district thermal energy distribution system 1 comprises a thermal energy circuit 10 and a plurality of buildings 5. The plurality of buildings 5 are thermally coupled to the thermal energy circuit 10. The thermal energy circuit 10 is arranged to circulate and store thermal energy in heat transfer liquid flowing through the thermal energy circuit 10.

According to one embodiment the heat transfer liquid comprises water. However, according to other embodiments other heat transfer liquid may be used. Some non-limiting examples are ammonia, Anti-freezing liquids (such as glycol), oils and alcohols. The heat transfer liquid may also comprise a mixture of two or more of the heat transfer liquids mentioned above.

The thermal energy circuit 10 comprises two conduits 12, 14 for allowing flow of heat transfer liquid therethrough. The temperature of the heat transfer liquid of the two conduits 12, 14 is set to be different. A hot conduit 12 in the thermal energy circuit 10 is configured to allow heat transfer liquid of a first temperature to flow therethrough. A cold conduit 14 in the thermal energy circuit 10 is configured to allow heat transfer liquid of a second temperature to flow therethrough. The second temperature is lower than the first temperature.

In case heat transfer liquid is water a suitable temperature range for the hot heat transfer liquid is between 5 and 45° C. and a suitable temperature range for the cold heat transfer liquid is between 0 and 40° C. A suitable temperature difference between the first and second temperatures is in the range of 5-16° C., preferably in the range of 7-12° C., more preferably 8-10° C.

Preferably the system is set to operate with a sliding temperature difference which varies depending on the climate. The sliding temperature difference is preferably fixed. Hence, the temperature difference is always set to momentarily slide with a fixed temperature difference.

The hot conduit 12 and the cool conduit 14 are separate. The hot conduit 12 and the cool conduit 14 may be parallelly arranged. The hot conduit 12 and the cool conduit 14 may be arranged as closed loops of piping. The hot conduit 12 and the cool conduit 14 are fluidly interconnected at the buildings 5 for allowing of thermal energy transfer to and from the buildings 5. This will be discussed more in detail further below.

The two conduits 12, 14 of the thermal energy circuit 10 may be formed by plastic, composite, concrete, or metal pipes. According to one embodiment High Density Polyethylene (HDPE) pipes may be used. The pipes may be single wall pipes. The pipes may be un-insulated. According to one embodiment the thermal energy circuit 10 is mainly arranged in the ground. The ground will be used as thermal inertia of the thermal energy circuit 10. Hence, insulation of the piping gives no extra value. Exceptions are installation in cities with a very warm climate or cities with very cold climate. Here the inertia of the ground may be more harmful than good during critical parts of the year. Here insulation of the piping may be needed.

According to one embodiment the two conduits 12, 14 of the thermal energy circuit 10 are dimensioned for pressures up to 1 MPa (10 bar). According to other embodiments the two conduits 12, 14 of the thermal energy circuit 10 may be dimensioned for pressures up to 0.6 MPa (6 bar) or for pressures up to 1.6 MPa (16 bar).

Each building 5 comprises at least one of one or more local thermal energy consumer assemblies 20 and one or more local thermal energy generator assemblies 30. Hence, each building comprises at least one local thermal energy consumer assembly 20 or at least one local thermal energy generator assembly 30. One specific building 5 may comprise more than one local thermal energy consumer assembly 20. One specific building 5 may comprise more than one local thermal energy generator assembly 30. One specific building 5 may comprise both a local thermal energy consumer assembly 20 and a local thermal energy generator assembly 30.

The local thermal energy consumer assembly 20 is acting as a thermal sink. Hence, the local thermal energy consumer assembly 20 is arranged to remove thermal energy from the thermal energy circuit 10. Or in other words, the local thermal energy consumer assembly 20 is arranged to transfer thermal energy from heat transfer liquid of the thermal energy circuit 10 to surroundings of the local thermal energy consumer assembly 20. This is achieved by transfer thermal energy from heat transfer liquid taken from the hot conduit 12 to surroundings of the local thermal energy consumer assembly 20, such that heat transfer liquid returned to the cold conduit 14 has a temperature lower than the first temperature and preferably a temperature equal to the second temperature.

The local thermal energy generator assembly 30 is acting as a thermal source. Hence, the local thermal energy generator assembly 30 is arranged to deposit thermal energy to the thermal energy circuit 10. Or in other words, the local thermal energy generator assembly 30 is arranged to transfer thermal energy from its surroundings to heat transfer liquid of the thermal energy circuit 10. This is achieved by transfer thermal energy from surroundings of the local thermal energy generator assembly 30 to heat transfer liquid taken from the cold conduit 12, such that heat transfer liquid returned to the hot conduit 12 has a temperature higher than the second temperature and preferably a temperature equal to the first temperature.

The one or more local thermal energy consumer assemblies 20 may be installed in the buildings 5 as local heaters for different heating needs. A local heater may be arranged to deliver space heating or hot tap hot water preparation. The local heater may alternatively or in combination deliver pool heating or ice- and snow purging. Hence, the local thermal energy consumer assembly 20 is arranged for deriving heat from heat transfer liquid of the hot conduit 12 and creates a cooled heat transfer liquid flow into the cold conduit 14. Hence, the local thermal energy consumer assembly 20 fluidly interconnects the hot and cool conduits 12, 14 such that hot heat transfer liquid can flow from the hot conduit 12 through the local thermal energy consumer assembly 20 and then into the cool conduit 14 after thermal energy in the heat transfer liquid has been consumed by the local thermal energy consumer assembly 20. The local thermal energy consumer assembly 20 operates to draw thermal energy from the hot conduit 12 to heat the building 5 and then deposits the cooled heat transfer liquid into the cool conduit 14.

The one or more local thermal energy generator assemblies 30 may be installed in different buildings 5 as local coolers for different cooling needs. A local cooler may be arranged to deliver space cooling or cooling for freezers and refrigerators. The local cooler may alternatively or in combination deliver cooling for ice rinks and ski centers or ice- and snow making. Hence, the local thermal energy generator assembly 30 is deriving cooling from heat transfer liquid of the cold conduit 14 and creates a heated heat transfer liquid flow into the hot conduit 12. Hence, the local thermal energy generator assembly 30 fluidly interconnects the cold and hot conduits 14, 12 such that cold heat transfer liquid can flow from the cold conduit 14 through the local thermal energy generator assembly 30 and then into the hot conduit 12 after thermal energy has been generated into the heat transfer liquid by the local thermal energy generator assembly 30. The local thermal energy generator assembly 30 operates to extract heat from the building 5 to cool the building 5 and deposits that extracted heat into the hot conduit 12.

Figure 2:
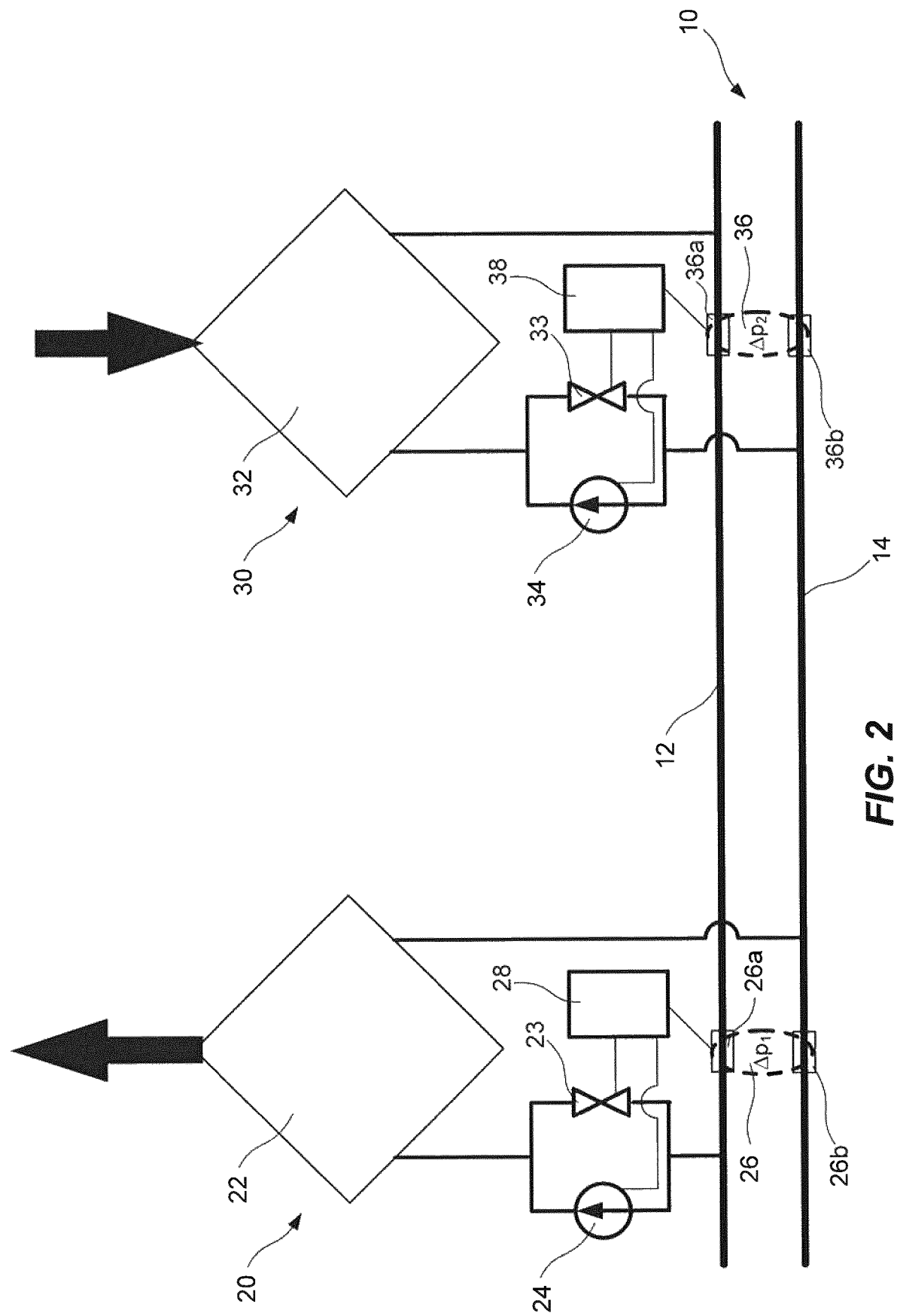
FIG. 2 is a schematic diagram of a local thermal energy consumer assembly and a local thermal energy generator assembly connected to a thermal energy circuit.

With reference to FIG. 2 the function of the local thermal energy consumer assembly 20 and the local thermal energy generator assembly 30 will now be discussed. In FIG. 2 one local thermal energy consumer assembly 20 and one local thermal energy generator assembly 30 are connected to the thermal energy circuit 10.

The local thermal energy consumer assembly 20 comprises a thermal energy consumer heat exchanger 22, a thermal energy consumer valve 23, a thermal energy consumer pump 24, a first pressure difference determining device 26, and a first controller 28.

The thermal energy consumer heat exchanger 22 is selectively connected to the hot conduit 12 via the thermal energy consumer valve 23 and the thermal energy consumer pump 24. Upon selecting the connection of the thermal energy consumer heat exchanger 22 to the hot conduit 12 to be via the thermal energy consumer valve 23, heat transfer liquid from the hot conduit 12 is allowed to flow into the thermal energy consumer heat exchanger 22. Upon selecting the connection of the thermal energy consumer heat exchanger 22 to the hot conduit 12 to be via the thermal energy consumer pump 24, heat transfer liquid from the hot conduit 12 is pumped into the thermal energy consumer heat exchanger 22. As will be discussed more in detail below, the choice of allowing heat transfer liquid from the hot conduit 12 to flow into the thermal energy consumer heat exchanger 22 or pumping heat transfer liquid from the hot conduit 12 into the thermal energy consumer heat exchanger 22, is made based on a local pressure difference between the hot and cold conduits 12, 14.

The thermal energy consumer valve 23 and the thermal energy consumer pump 24 may be arranged as separate devices. The thermal energy consumer valve 23 and the thermal energy consumer pump 24 may be arranged as a single device. The thermal energy consumer valve 23 and the thermal energy consumer pump 24 may be arranged in parallel, as illustrated in FIG. 2. The thermal energy consumer valve 23 and the thermal energy consumer pump 24 may be arranged in series. In this last embodiment wherein the thermal energy consumer valve 23 and the thermal energy consumer pump 24 is arranged in series the pump is arranged to be set in an inactive state allowing a flow of heat transfer liquid there through.

The thermal energy consumer heat exchanger 22 is further connected to the cold conduit 14 for allowing return of heat transfer liquid from the thermal energy consumer heat exchanger 22 to the cold conduit 14.

The first pressure difference determining device 26 is adapted to determine a first local pressure difference, $\Delta p_1$, of the thermal energy circuit 10. The first local pressure difference is preferably measured in the vicinity to where the thermal energy consumer heat exchanger 22 is connected to the thermal energy circuit 10. The first pressure difference determining device 26 may comprises a first hot conduit pressure determining device 26a and a first cold conduit pressure determining device 26b. The first hot conduit pressure determining device is arranged to be connected to the hot conduit 12 for measuring a first local pressure of the heat transfer liquid of the hot conduit. The first cold conduit pressure determining device is arranged to be connected to the cold conduit 14 for measuring a first local pressure of the heat transfer liquid of the cold conduit. The first local pressure difference device 26 is arranged to determine the first local pressure difference as a pressure difference between the first local pressure of the heat transfer liquid of the hot conduit and the first local pressure of the heat transfer liquid of the cold conduit. Hence, the first local pressure difference may be defined as a local pressure difference between a first local pressure of the heat transfer liquid of the hot conduit and a first local pressure of the heat transfer liquid of the cold conduit. Preferably, the first local pressure of the heat transfer liquid of the hot conduit is measured in the vicinity to where the thermal energy consumer heat exchanger 22 is connected to the hot conduit 12. Preferably, the first local pressure of the heat transfer liquid of the cold conduit is measured in the vicinity to where the thermal energy consumer heat exchanger 22 is connected to the cold conduit 14.

The first pressure difference determining device 26 may be implemented as a hardware device, a software device, or as a combination thereof. The first pressure difference determining device 26 is arranged to communicate the first local pressure difference, $\Delta p_1$, to the first controller 28.

The first controller 28 may be implemented as a hardware controller, a software controller, or as a combination thereof. The first controller 28 is arranged to selectively control the use of either the thermal energy consumer valve 23 or the thermal energy consumer pump 24. The first controller 28 is arranged to perform the selective control based on the first local pressure difference provided by the first pressure difference determining device 26. The first controller 28 is arranged to communicate with the thermal energy consumer valve 23 and the thermal energy consumer pump 24 for controlling the thermal energy consumer valve 23 and the thermal energy consumer pump 24. The first controller 28 is arranged to selectively control the use of the thermal energy consumer valve 23 when the first local pressure difference indicates that the first local pressure of the heat transfer liquid of the hot conduit is larger than the first local pressure of the heat transfer liquid of the cold conduit. The first controller 28 is arranged to selectively control the use of the thermal energy consumer pump 24 when the first local pressure difference indicates that the first local pressure of the heat transfer liquid of the hot conduit is lower than or equal to the first local pressure of the heat transfer liquid of the cold conduit.

The thermal energy consumer heat exchanger 22 is arranged to transfer thermal energy from heat transfer liquid to surroundings of the thermal energy consumer heat exchanger 22. The heat transfer liquid returned to the cold conduit 14 has a temperature lower than the first temperature. Preferably, thermal energy consumer heat exchanger 22 is controlled such that the temperature of the heat transfer liquid returned to the cold conduit 14 is equal to the second temperature.

The local thermal energy generator assembly 30 comprises a thermal energy generator heat exchanger 32, a thermal energy generator valve 33, a thermal energy generator pump 34, a second pressure difference determining device 36, and a second controller 28.

The thermal energy generator heat exchanger 32 is selectively connected to the cold conduit 14 via the thermal energy generator valve 33 and the thermal energy generator pump 34. Upon selecting the connection of the thermal energy generator heat exchanger 32 to the cold conduit 14 to be via the thermal energy generator valve 33, heat transfer liquid from the cold conduit 14 is allowed to flow into the thermal energy generator heat exchanger 32. Upon selecting the connection of the thermal energy generator heat exchanger 32 to the cold conduit 14 to be via the thermal energy generator pump 34, heat transfer liquid from the cold conduit 14 is pumped into the thermal energy generator heat exchanger 32. As will be discussed more in detail below, the choice of allowing heat transfer liquid from the cold conduit 14 to flow into the thermal energy generator heat exchanger 32 or pumping heat transfer liquid from the cold conduit 14 into the thermal energy generator heat exchanger 32, is made based on a local pressure difference between the hot and cold conduits 12, 14.

The thermal energy generator valve 33 and the thermal energy generator pump 34 may be arranged as separate devices. The thermal energy generator valve 33 and the thermal energy generator pump 34 may be arranged as a single device. The thermal energy generator valve 33 and the thermal energy generator pump 34 may be arranged in parallel, as illustrated in FIG. 2. The thermal energy generator valve 33 and the thermal energy generator pump 34 may be arranged in series. In this last embodiment wherein the thermal energy generator valve 33 and the thermal energy generator pump 34 is arranged in series the pump is arranged to be set in an inactive state allowing a flow of heat transfer liquid there through.

The thermal energy generator heat exchanger 32 is further connected to the hot conduit 12 for allowing return of heat transfer liquid from the thermal energy generator heat exchanger 32 to the hot conduit 12.

The second pressure difference determining device 36 is adapted to determine a second local pressure difference, $\Delta p_2$, of the thermal energy circuit 10. The second local pressure difference is preferably measured in the vicinity to where the thermal energy generator heat exchanger 32 is connected to the thermal energy circuit 10. The second pressure difference determining device 36 may comprises a second hot conduit pressure determining device 36a and a second cold conduit pressure determining device 36b. The second hot conduit pressure determining device is arranged to be connected to the hot conduit 12 for measuring a second local pressure of the heat transfer liquid of the hot conduit. The second cold conduit pressure determining device is arranged to be connected to the cold conduit 14 for measuring a second local pressure of the heat transfer liquid of the cold conduit. The second local pressure difference device 36 is arranged to determine the second local pressure difference as a pressure difference between the second local pressure of the heat transfer liquid of the hot conduit and the second local pressure of the heat transfer liquid of the cold conduit. Hence, the second local pressure difference may be defined as a local pressure difference between a second local pressure of the heat transfer liquid of the hot conduit and a second local pressure of the heat transfer liquid of the cold conduit. Preferably, the second local pressure of the heat transfer liquid of the hot conduit is measured in the vicinity to where the thermal energy generator heat exchanger 32 is connected to the hot conduit 12. Preferably, the second local pressure of the heat transfer liquid of the cold conduit is measured in the vicinity to where the thermal energy generator heat exchanger 32 is connected to the cold conduit 14.

The second pressure difference determining device 36 may be implemented as a hardware device, a software device, or as a combination thereof. The second pressure difference determining device 36 is arranged to communicate the second local pressure difference, $\Delta p_2$, to the second controller 38.

The second controller 38 may be implemented as a hardware controller, a software controller, or as a combination thereof. The second controller 38 is arranged to selectively control the use of either the thermal energy generator valve 33 or the thermal energy generator pump 34. The second controller 38 is arranged to perform the selective control based on the second local pressure difference provided by the second pressure difference determining device 36. The second controller 38 is arranged to communicate with the thermal energy generator valve 33 and the thermal energy generator pump 34 for controlling the thermal energy generator valve 33 and the thermal energy generator pump 34. The second controller 38 is arranged to selectively control the use of the thermal energy generator valve 33 when the second local pressure difference indicates that the second local pressure of the heat transfer liquid of the cold conduit is larger than the second local pressure of the heat transfer liquid of the hot conduit. The second controller 38 is arranged to selectively control the use of the thermal energy generator pump 34 when the second local pressure difference indicates that the second local pressure of the heat transfer liquid of the cold conduit is lower than or equal to the second local pressure of the heat transfer liquid of the hot conduit.

The thermal energy generator heat exchanger 32 is arranged to transfer thermal energy from its surroundings to heat transfer liquid. The heat transfer liquid returned to hot conduit 12 has a temperature higher than the second temperature. Preferably, thermal energy generator heat exchanger 32 controlled such that the temperature of the heat transfer liquid returned to the hot conduit 12 is equal to the first temperature.

Accordingly, the district thermal energy distribution system 1 comprises a thermal energy circuit 10 comprising a hot and a cold conduit 12, 14 for allowing flow of heat transfer liquid therethrough. The district thermal energy distribution system 1 further comprises a thermal energy consumer heat exchanger 22 and a thermal energy generator heat exchanger 32. The thermal energy consumer heat exchanger 22 is selectively connected to the hot conduit 12 via the thermal energy consumer valve 23 or the thermal energy consumer pump 24. The thermal energy generator heat exchanger 32 is selectively connected to the cold conduit 14 via the thermal energy generator valve 23 or the thermal energy generator pump 24.

In the in FIG. 2 shown embodiment the first and second pressure difference determining devices 26; 36 are two physically different pressure difference determining devices. However, according to another embodiment one specific local thermal energy consumer assembly 20 and one specific local thermal energy generator assembly 30 may share the same pressure difference determining device. Hence, the first and second pressure difference determining devices 26; 36 may physically be the same pressure difference determining device. According to a further embodiment two specific local thermal energy consumer assemblies 20 may share the same pressure difference determining device. According to a yet another embodiment two specific local thermal energy generator assemblies 30 may share the same pressure difference determining device.

In the in FIG. 2 shown embodiment the first and second controllers 28; 38 are two physically different controllers. However, according to another embodiment one specific local thermal energy consumer assembly 20 and one specific local thermal energy generator assembly 30 may share the same controller. Hence, the first and second controller 26; 36 may physically be the same controller. According to a further embodiment two specific local thermal energy consumer assemblies 20 may share the same controller. According to a yet another embodiment two specific local thermal energy generator assemblies 30 may share the same controller.

Preferably, the demand to inhale or exhale heat using the thermal energy consumer heat exchangers 22 and the thermal energy generator heat exchangers 32 is made at a defined temperature difference. A temperature difference of 8-10° C. corresponds to optimal flows through the thermal energy consumer heat exchangers 22 and the thermal energy generator heat exchangers 32.

The local pressure difference between the hot and cold conduits 12, 14 may vary along the thermal energy circuit 10. Especially, the local pressure difference between the hot and cold conduits 12, 14 may vary from positive to negative pressure difference seen from one of the hot and cold conduits 12, 14. Hence, sometimes a specific local thermal energy consumer/generator assembly 20, 30 may need to pump heat transfer liquid through the corresponding thermal energy consumer/generator heat exchanger 22, 32 and sometimes the specific local thermal energy consumer/generator assembly 20, 20 may need to let heat transfer liquid flow through the corresponding thermal energy consumer/generator heat exchanger 22, 32. Accordingly, it will be possible to let all the pumping within the system 1 to take place in the local thermal energy consumer/generator assemblies 20, 30. Due to the limited flows and pressures needed small frequency controlled circulation pumps may be used.

The thermal energy consumer pump 24 and/or the thermal energy generator pump 24 may for example be a frequency controlled circulation pump.

The thermal energy consumer valve 23 and/or the thermal energy generator valve 33 may be a regulation valve.

The person skilled in the art realizes that the present invention by no means is limited to the preferred embodiments described above. On the contrary, many modifications and variations are possible within the scope of the appended claims.

For example, the district thermal energy distribution system 1 may comprise a thermal server plant 2. The thermal server plant 2 functions as an external thermal source and/or thermal sink. The function of the thermal server plant 2 is to maintain the temperature difference between the hot and cold conduits 12, 14 of the thermal energy circuit 10. That is, the thermal server plant 2 may be used for balancing the district thermal energy distribution system 1 such that when the thermal energy circuit 10 reaches a temperature end point the thermal server plant 2 is arranged to inhale or exhale thermal energy to/from the thermal energy circuit 10. In winter time, when there is higher probability that the hot conduit 12 reaches its' lowest temperature end point, the thermal server plant 2 is used for adding thermal energy to the thermal energy circuit 10. In summer time, when there is higher probability that the cold conduit reaches its' highest temperature end point, the thermal server plant 2 is used to subtract thermal energy from the thermal energy circuit 10.

Additionally, variations to the disclosed embodiments can be understood and effected by the skilled person in practicing the claimed invention, from a study of the drawings, the disclosure, and the appended claims.

The invention claimed is:

1. A district thermal energy distribution system, comprising:
   a thermal energy circuit comprising two conduits for allowing flow of heat transfer liquid therethrough,
   wherein a hot conduit in the thermal energy circuit is configured to allow heat transfer liquid of a first temperature to flow therethrough, and
   wherein a cold conduit in the thermal energy circuit is configured to allow heat transfer liquid of a second temperature to flow therethrough, the second temperature is lower than the first temperature;
one or more local thermal energy consumer assemblies, each comprising:
  a thermal energy consumer heat exchanger selectively connected to the hot conduit via a thermal energy consumer valve for allowing heat transfer liquid from the hot conduit to flow into the thermal energy consumer heat exchanger, selectively connected to the hot conduit via a thermal energy consumer pump for pumping heat transfer liquid from the hot conduit into the thermal energy consumer heat exchanger, and connected to the cold conduit for allowing return of heat transfer liquid from the thermal energy consumer heat exchanger to the cold conduit, wherein the thermal energy consumer heat exchanger is arranged to transfer thermal energy from heat transfer liquid to surroundings of the thermal energy consumer heat exchanger, such that heat transfer liquid returned to the cold conduit has a temperature lower than the first temperature;
  a first pressure difference determining device adapted to determine a first local pressure difference, $\Delta p_1$ of the thermal energy circuit; and
  a first controller arranged to, based on the first local pressure difference, selectively control the use of either the thermal energy consumer valve or the thermal energy consumer pump; and
one or more local thermal energy generator assemblies, each comprising;
  a thermal energy generator heat exchanger selectively connected to the cold conduit via a thermal energy generator valve for allowing heat transfer liquid from the cold conduit to flow into the thermal energy generator heat exchanger, selectively connected to the cold conduit via a thermal energy generator pump for pumping heat transfer liquid from the cold conduit into the thermal energy generator heat exchanger, and connected to the hot conduit for allowing return of heat transfer liquid from the thermal energy generator heat exchanger to the hot conduit, wherein the thermal energy generator heat exchanger is arranged to transfer thermal energy from its surroundings to heat transfer liquid, such that the heat transfer liquid returned to the hot conduit has a temperature higher than the second temperature;
  a second pressure difference determining device adapted to determine a second local pressure difference, $\Delta p_2$, of the thermal energy circuit; and
  a second controller arranged to, based on the second local pressure difference, selectively control the use of either the thermal energy generator valve or the thermal energy generator pump,
wherein the first controller is arranged to selectively use the thermal energy consumer valve when the first local pressure difference indicates that the first local pressure of the heat transfer liquid of the hot conduit is larger than the first local pressure of the heat transfer liquid of the cold conduit,
wherein the first controller is arranged to selectively use the thermal energy consumer pump when the first local pressure difference indicates that the first local pressure of the heat transfer liquid of the hot conduit is lower than or equal to the first local pressure of the heat transfer liquid of the cold conduit,
wherein the second controller is arranged to selectively use the thermal energy generator valve when the second local pressure difference indicates that the second local pressure of the heat transfer liquid of the cold conduit is larger than the second local pressure of the heat transfer liquid of the hot conduit, and
wherein the second controller is arranged to selectively use the thermal energy generator pump when the second local pressure difference indicates that the second local pressure of the heat transfer liquid of the cold conduit is lower than or equal to the second local pressure of the heat transfer liquid of the hot conduit.

2. The system according to claim 1, wherein the hot and cold conduits are dimensioned for pressures up to 0.6 MPa, 1 MPa, or 1.6 MPa.

3. The system according to claim 1, wherein the first and second local pressure differences are set to be at most ±0.2 MPa, ±0.3 MPa or ±0.6 MPa depending on chosen dimensioning pressure.

4. The system according to claim 1, wherein the system further comprises a building comprising both a local thermal energy consumer assembly and a local thermal energy generator assembly, wherein the first pressure difference determining device of the local thermal energy consumer assembly of the building and the second pressure difference determining device of the local thermal energy generator assembly of the building are integrally formed as a single pressure difference determining device.

5. The system according to claim 1, wherein the system further comprises a building comprising both a local thermal energy consumer assembly and a local thermal energy generator assembly, wherein the first controller of the local thermal energy consumer assembly of the building and the second controller of the local thermal energy generator assembly of the building are integrally formed as a single controller.

6. The system according to claim 1, wherein the thermal energy consumer heat exchanger is chosen from the group consisting of a heat pump for comfort heating, a heat pump for tap hot water preparation and a heat pump for snow or ice purging.

7. The system according to claim 1, wherein the thermal energy generator heat exchanger is chosen from a group consisting of a cooling machine for local comfort cooling, a heat exchanger in a forced exit air ventilation system, a heat exchanger in a waste water system, a freezer and a cooling machine for a computer center.

8. The system according to claim 1, wherein the temperature range of the first and second temperatures is −10-45° C.

9. The system according to claim 1, wherein a temperature difference between the first and second temperatures is in a range of 5-16° C.

10. The system according to claim 1, wherein the first pressure difference determining device is arranged to determine the first local pressure of the heat transfer liquid of the hot conduit adjacent to where the thermal energy consumer heat exchanger is connected to the hot conduit and to determine the first local pressure of the heat transfer liquid of the cold conduit adjacent to where the thermal energy consumer heat exchanger is connected to the cold conduit.

11. The system according to claim 1, wherein the second pressure difference determining device is arranged to determine the second local pressure of the heat transfer liquid of the hot conduit adjacent to where the thermal energy generator heat exchanger is connected to the hot conduit and to determine the second local pressure of the heat transfer liquid of the cold conduit adjacent to where the thermal energy generator heat exchanger is connected to the cold conduit.

12. The system according to claim 1, wherein a temperature range of the first and second temperatures is 4-32° C.

13. The system according to claim 1, wherein a temperature difference between the first and second temperatures is in the range of 7-12° C.

14. The system according to claim 1, wherein a temperature difference between the first and second temperatures is in the range of 8-10° C.

* * * * *